Patented Jan. 17, 1950

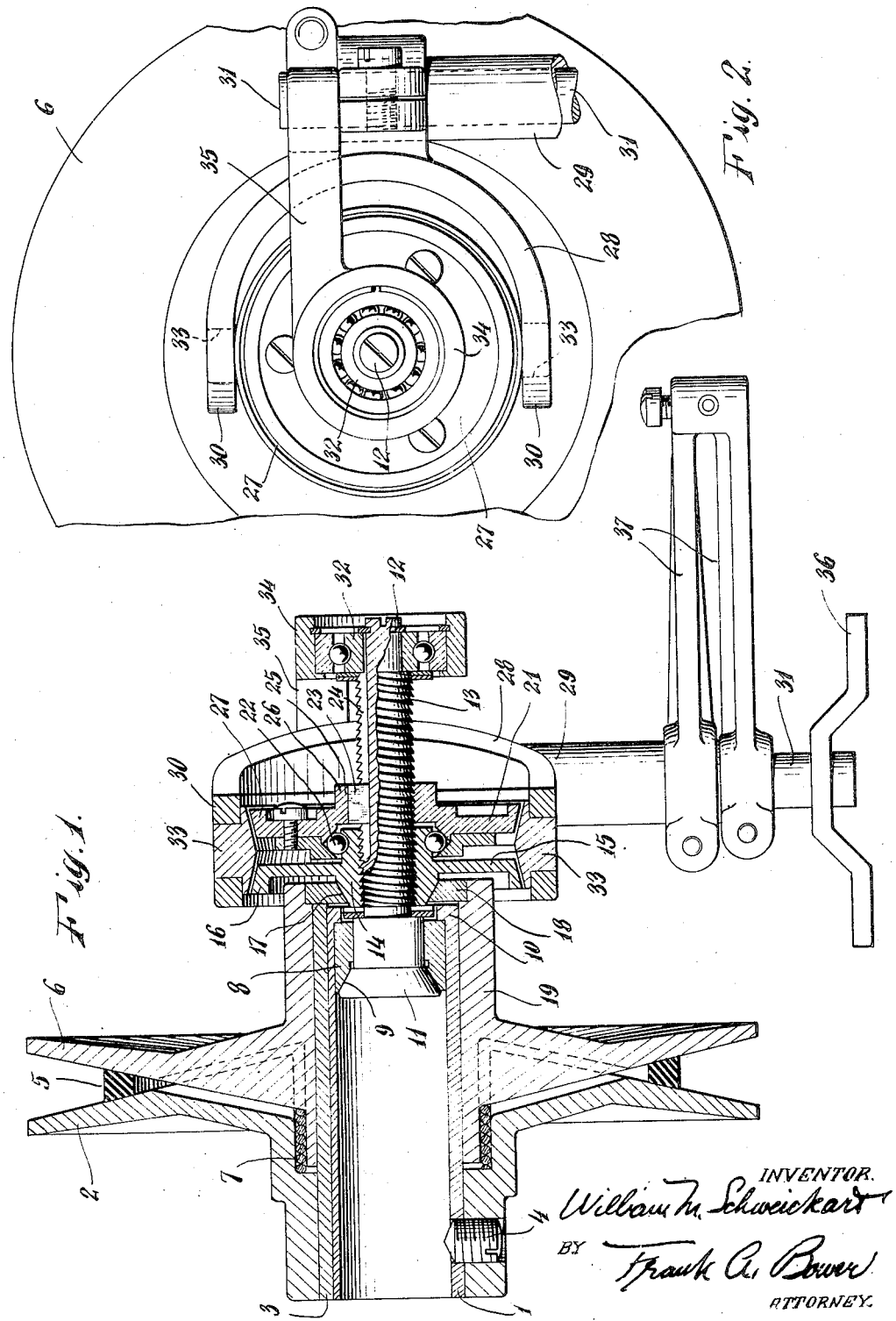

2,495,078

UNITED STATES PATENT OFFICE 2,495,078

VARIABLE DIAMETER PULLEY

William M. Schweickart, Mentor, Ohio

Application January 3, 1947, Serial No. 720,112

5 Claims. (Cl. 74—230.17)

1

This invention relates to a means of control of an adjustable pitch pulley and more particularly to a remote control means for adjusting the diameter of a variable pitch pulley.

It is an object of this invention to provide a simple and inexpensive control for an adjustable pitch pulley.

It is a further object to provide a remote control for adjusting a variable pitch pulley.

It is a still further object of this invention to provide a simple mechanical remote control for adjusting the pitch of a variable diameter pulley by which the pulley disks are held in position with a minimum of thrust on moving parts.

These and other objects of this invention will be made apparent upon consideration of the following description together with the following drawings in which:

Fig. 1 is a longitudinal central section of an adjustable pitch pulley and mechanism for varying its diameter; and Fig. 2 is an end view from the right of Fig. 1 of the adjustable pitch pulley.

In Fig. 1 a hollow sleeve 1 is adapted to receive the end of a motor shaft. A pulley disk 2 is mounted on the sleeve 1 and secured by a key 3 and by a set screw 4 fastening the pulley disk and sleeve on the motor shaft. Thus the disk 2 is fixed on and rotates with the sleeve 1. A disk 6 forming the other half of the adjustable pitch pulley is slidably mounted on the sleeve 1 and secured to rotate with the sleeve 1 and pulley disk 2 by the key 3. A pulley belt 5 fits between the disks 2 and 6 and slides in and out on the disk faces when the space between them is altered. The disks 2 and 6 are shown with interlocking faces to permit greater variation in pitch diameter. A spring 7 between disks 2 and 6 adds to the pressure of the belt 5 urging the slidable disk 6 away from the fixed disk 2.

A collar shaped bushing 8 with a tapered inner end surface 9 seats against the shoulder 10 in the inner end of the sleeve 1 and receives a head 11 of a stud 12 which projects into the sleeve 1 and the bushing 8. The head 11 is flared to seat in the tapered bearing portion 9 of the bushing 8 and is frictionally engageable by the shaped bushing 8 so as to be turned with the sleeve 1 when so engaged. As shown in Fig. 2, the end of the stud 12 is supported in a bearing 32 set in a collar 34 on a fixed arm 35.

The shank of the stud 12 has buttress threads 13 engaging the buttress threads in a hub 14 of plate 15 mounted on the stud 12 as shown in Fig. 1. The plate 15 has the hub 14 with a but-

2 tress thread passage through the center and the radial disk portion carrying peripheral flange 16 having a conical outer surface. The hub 14 of the plate 15 has a conical bearing surface 17 formed at the end adjacent sleeve 1. Bushing 18 is carried in the end of the hub 19 of the disk 6 and is shaped to fit on the conical surface of the bearing 17 and thus the thrust of the spring through the belt 5 on the disk 6 is taken by the hub 14 of plate 15 and transmitted to the threads 13 of the stud 12.

A second plate 21 is fitted over the stud 12 and rotatably connected to plate 15 through the ball bearing 22 and held rotatable with and slidable on stud 12 by a key 23 in grooves 24 and 25 in stud 12 and hub 26 of plate 21, respectively. The radial disk of the plate 21 has a peripheral flange 27 formed with a conical outer surface pitched opposite to the conical outer surface of the flange 16 so that the sloping surfaces face inward and toward each other.

A yoke 28 is mounted on a sleeve 29 pivoting on a shaft 31. The yoke 28 carries arms 30 formed with inserted wedge-shape buttons 33 which are positioned to fit between the conical surfaces of flanges 16 and 27 to be engageable with either one or the other of said flanges. The shaft 31 is anchored in a stationary supporting bracket 36 while arms 37 actuated by a suitable remote means such as Bowden wire rotate the sleeve 29 on the stationary shaft 31 to move yoke 28 axially of the stud 12 and toward or away from the adjustable pulley 2,6 and bring buttons 33 into engagement with either flange 16 or flange 27 to retard or stop the rotation of plate 15 or 21.

The operation of this invention to vary the pitch of the pulley is substantially as follows:

With the pulley 2,6 rotating on sleeve 1 on a motor shaft (not shown) the diameter of the pulley 2,6 is determined by the position of disk 6 as it is urged in one direction by spring 7 and belt 5 against the bearing 17 pressing in the opposite direction. The stud 12 rotates with the disks 2 and 6 through the friction drive of the head 11 in the seat 9. When the buttons 33 are disengaged from the flanges 16 and 27 the plates 15 and 21 both move with the stud 12. This is the normal running condition for the mechanism.

To decrease the pulley diameter by drawing the disks 2 and 6 apart the buttons 33 are brought into engagement with the flange 27 of plate 21 by the remote control means through the arms 37, sleeve 29 and yoke 28. The buttons 33 being stationary retard or stop the rotation of plate 21 which is keyed to stud 12 and thus prevents stud 12 from rotating with the pulley 2,6. The plate 15 continues to rotate with disk 6 because of the friction exerted upon it by the thrust of the bushing 18 on the bearing 17. When the stud 12 is held against rotating by the key 23 while the plate 15 threaded on the stud 12 continues to rotate, plate 15 moved along the stud 12 to the right in the manner of a nut or a bolt and the plate 15 moving away from the pulley 2,6 releases the thrust on the bearing 17 and the disk 6 moves away from the disk 2 reducing the diameter of the pulley 2,6 with the belt 5 moving inward.

The thrust on stud 12 of the hub 14 as it moves to the right away from pulley 2, 6 is taken up by the head 11 on the tapered seat 9. As this action takes place the plate 21 moves away from the pressure of the buttons 33 and is released from the braking contact of the buttons 33 to the point where the plate 21 is permitted to again rotate permitting stud shaft 12 to rotate and terminating the threading of the plate 15 on the threaded portion 13. The plates 15 and 21 remain in this new position until a change is dictated by movement of the buttons 33 as controlled by the remote control means through the arms 37, sleeve 29 and yoke 28. Thus, the diameter or pitch of the adjustable pulley 2, 6 is determined by adjustment of the remote control means.

To increase the diameter of the pulley 2, 6 the Bowden wire or other remote control means is adjusted to move the buttons 33 against the plate 15. Thus, the plate 15 is restricted from rotating while the plate 21 remaining disengaged from the braking action of the buttons 33 continues to be rotated together with the shaft 12 through the frictional contact of the head 11 in the seat 9 on bushing 8 and in the sleeve 1. The relative rotation between the threaded portion 13 and the plate 15 is opposite from the relative rotation when the stud 12 is held stationary and plate 15 rotates, so that with plate 15 stationary and the stud member 12 rotating, the threaded portion screws into the plate 15 with the effect of a bolt threading into a nut. The disk 6 turning on the now stationary bearing 17 receives a thrust from the leftward moving plate 15 which presses against the spring 7 and the pull of the pulley belt 5 to force the disks 2 and 6 together thus increasing the diameter of the pulley 2, 6.

This apparatus is advantageous in providing mechanism for adjusting pitch diameters of pulleys with a minimum of wear on the thrust bearings which hold the pulley faces in position. In adjustable pitch pulleys these thrust bearings are a source of wear as they must bear the sideward thrust of the pulley belt. In this invention the only wear on the thrust bearings 17, 18, 9 and 14 occurs while the diameter of the pulley is being changed because the stud shaft 12 is rotated with the bearing 8 when the control means is not being operated and the plate 15 rotates with the disk 6 except when the buttons 33 brake against the flange 16 to hold the plate 15. This invention is also advantageous in the low cost and simplicity of the control parts.

It will be understood that the arrangement of the threaded stud and plates and the remote control means may be changed without departing from the principle of the invention. Other remote control means can be substituted for the Bowden wire shown such as a hydraulic cylinder, a mechanical cam, a linkage mechanism or any other mechanically operated remote control means. It is, therefore, intended that the invention not be limited other than by the scope of the appended claims.

I claim:

1. In a device for controlling the diameter of an adjustable pitch pulley, the combination with a pair of relatively movable disks and a threaded shaft engageable with one of said disks, of a clutch on said threaded shaft comprised of a plurality of axially connected and independent rotatable plates, one of said plates threaded on said threaded shaft and engaging one of said pulley disks, another of said plates secured to said shaft and slidable thereon and means for restraining the rotation of either of said plates to induce relative motion between said threaded plate and threaded stud.

2. Speed varying mechanism comprising a rotatable sleeve adapted to fit the end of a shaft, a stud connected to be rotated by said sleeve, a rotatable member keyed to said stud, a second rotatable member threaded to said stud, relatively movable pulley disks on said sleeve, means connecting one of said disks to one of said members to be axially moved thereby relative to the other disk, and a device for engaging said last named member to retard the rotation thereof so that the relative rotation of said stud will move it and said connected disk in a direction to disengage said member from said device.

3. A variable pitch pulley comprising a first disk, a second disk axially movable with relation to said first disk to vary the pitch diameter of the pulley, a threaded shaft engageable with said first disk to rotate therewith, a clutch member threaded on said shaft and engageable with said second disk to rotate therewith, another clutch member slidably engaged on said shaft, and a control device for alternatively engaging one or the other of said clutch members to retard the rotation of the engaged clutch member and cause said threaded shaft to move said engaged member in a direction to disengage it from the said control device.

4. A variable pitch pulley comprising a first disk, a second disk axially movable with relation to said first disk, a threaded shaft engageable with said first disk to rotate therewith, a clutch on said shaft engageable with said second disk, said clutch having one plate threaded on said shaft and another plate slidably engaged on said shaft, and a control device having a first surface for engaging the threaded clutch plate and a second surface for engaging the sliding clutch plate, said control device moving alternatively in opposite directions to engage the threaded clutch plate and the sliding clutch plate and by retarding the motion of the engaged clutch plate cause the clutch member to move in a direction to disengage the engaged clutch plate from the control device.

5. A variable pitch pulley comprising a first disk, a second disk axially movable with relation to said first disk, a threaded shaft engageable with said first disk, a clutch on said shaft engageable with said second disk, said clutch having one plate threaded on said shaft and another plate slidably engaged on said shaft, and a control device having a first surface for engaging the threaded clutch plate and a second surface for engaging the sliding clutch plate, said control device alternatively engaging said clutch plates and by retarding the motion of the engaged clutch plate cause said threaded stud to move the clutch member in a direction to disengage the engaged clutch plate from the clutch member, said clutch member centered with relation to said control device so that the travel of disengagement by said clutch member is limited by the engaging surfaces of the control device.

WILLIAM M. SCHWEICKART.

REFERENCES CITED

The following references are of record in the file of this patent:

UNITED STATES PATENTS

| Number | Name | Date |
|---|---|---|
| 2,199,596 | Morse | May 7, 1940 |
| 2,200,101 | Schmitter | May 7, 1940 |
| 2,253,357 | Wetzel | Aug. 19, 1941 |
| 2,348,994 | Otto | May 16, 1944 |

FOREIGN PATENTS

| Number | Country | Date |
|---|---|---|
| 114,244 | Great Britain | Mar. 28, 1918 |
| 350,354 | Germany | Sept. 14, 1920 |